United States Patent [19]

Young et al.

[11] 4,098,076
[45] Jul. 4, 1978

[54] COOLING AIR MANAGEMENT SYSTEM FOR A TWO-DIMENSIONAL AIRCRAFT ENGINE EXHAUST NOZZLE

[75] Inventors: John H. Young, South Windsor, Conn.; Gerald F. Goetz, Seattle, Wash.

[73] Assignee: United Technologies Corporation, Hartford, Conn.

[21] Appl. No.: 751,429

[22] Filed: Dec. 16, 1976

[51] Int. Cl.$^2$ .................... F02K 1/08; B64C 15/06
[52] U.S. Cl. .................................. 60/230; 60/266; 60/271; 239/265.19
[58] Field of Search .......... 60/230, 271, 266, 39.66; 239/265.19, 265.33, 265.37, 265.39

[56] References Cited

U.S. PATENT DOCUMENTS

| | | | |
|---|---|---|---|
| 3,774,868 | 11/1973 | Goetz | 239/265.19 |
| 4,000,612 | 1/1977 | Wakeman et al. | 60/230 |
| 4,037,405 | 7/1977 | Huenniger | 60/230 |

*Primary Examiner*—Robert E. Garrett
*Attorney, Agent, or Firm*—Norman Friedland

[57] ABSTRACT

This invention relates to a cooling air management system for a movable centerbody having articulating panels located in the two-dimensional exhaust nozzle of a jet engine so that movement of the centerbody and articulating its panels can provide thrust vectoring, variable geometry internal nozzle expansion or other flight control functions. Cooling air supplied from a fan discharge and/or ram air is fed internally of the centerbody to enhance its operation in a hostile environment while assuring sufficient pressure to effectuate cooling throughout the flight envelope of the aircraft, which during different regimes requires different cooling loads.

7 Claims, 8 Drawing Figures

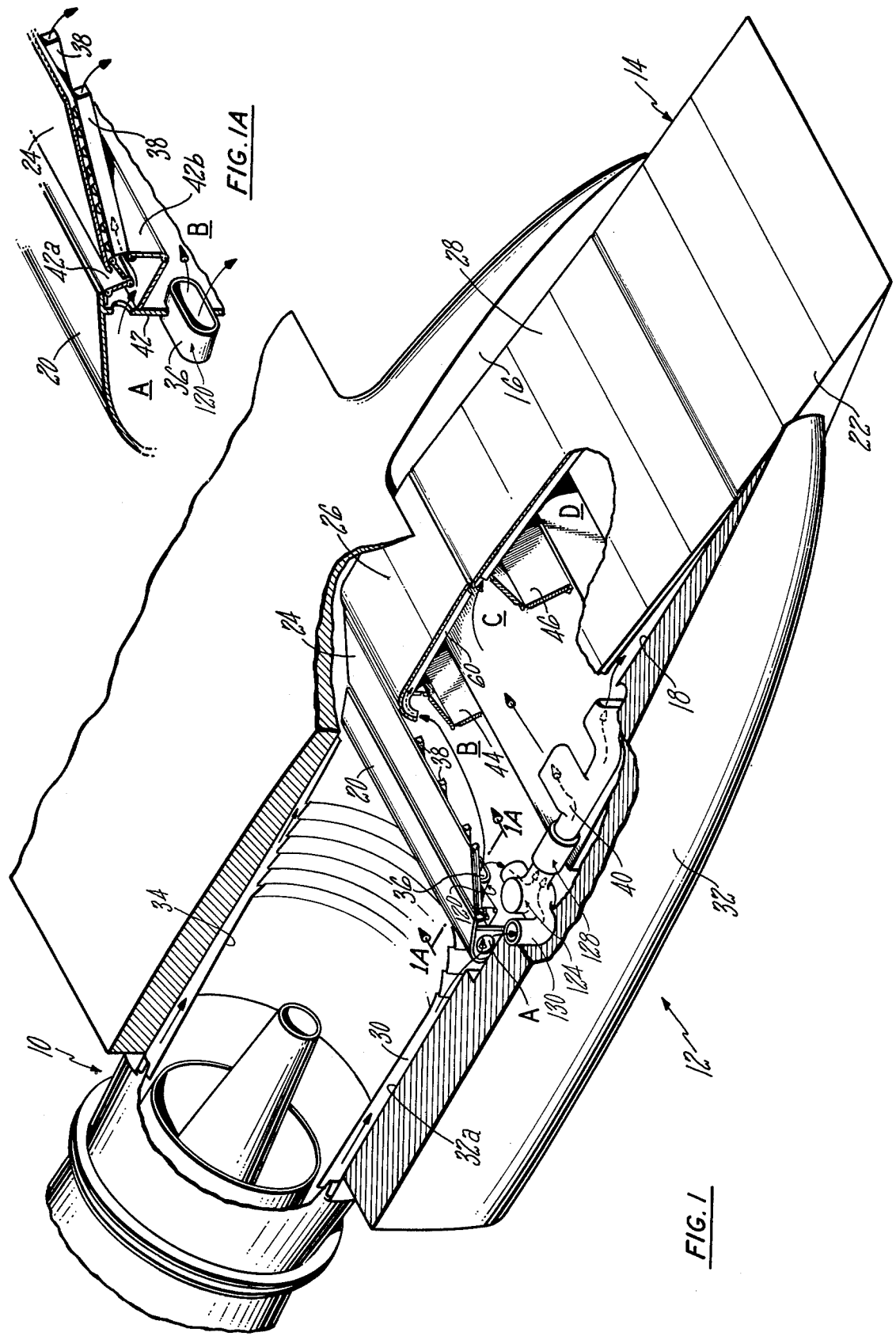

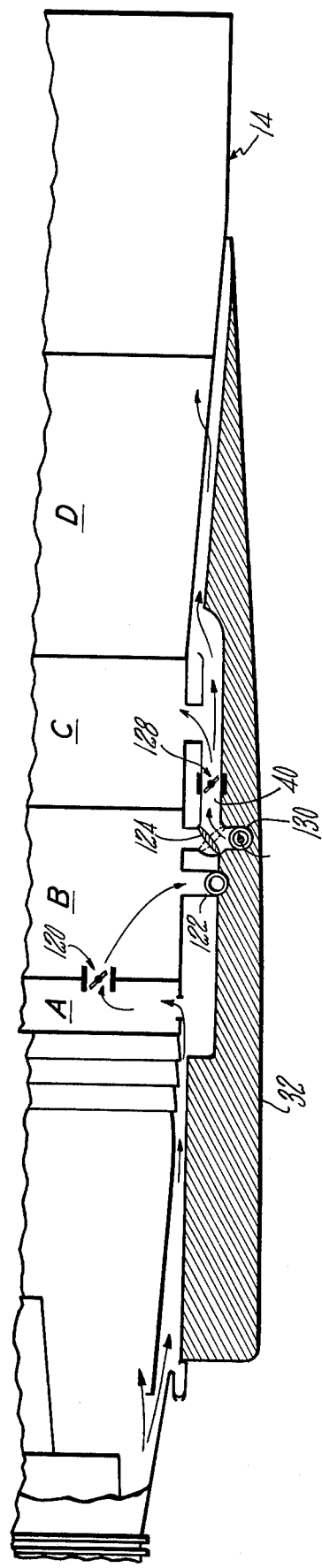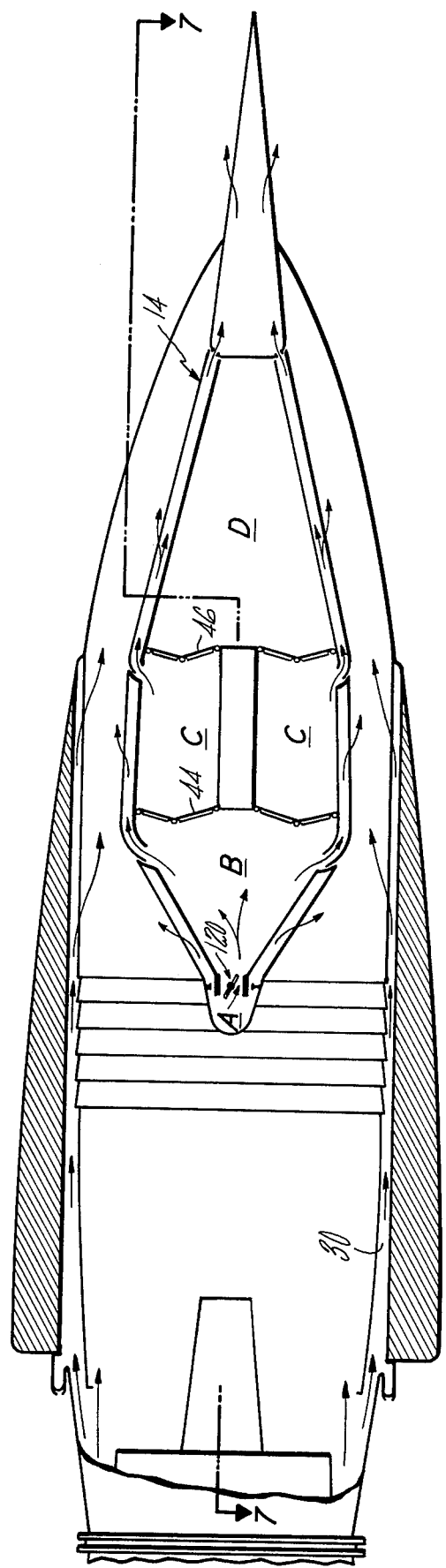

COOLING AIR MANAGEMENT SYSTEM FOR A TWO-DIMENSIONAL AIRCRAFT ENGINE EXHAUST NOZZLE

BACKGROUND OF THE INVENTION

This invention relates to gas turbine engine exhaust nozzles and particularly to a cooling air management system for a movable and articulated panel centerbody operable in a two-dimensional nozzle.

Because of the hostile environment associated with the aircraft gas turbine engine exhaust and in order to effectively utilize the exhaust nozzle as a flight control adjunct to aircraft operation, it is necessary to cool the working components. As can be seen in U.S. Pat. No. 3,774,868 granted to G. F. Goetz (the joint applicant of this patent application), a two-dimensional exhaust nozzle is integrated with the airframe and a centerbody is articulated to provide certain flight control modes, as thrust vectoring, thrust reversing, internal nozzle expansion and variable nozzle geometry. This invention contemplates the cooling of such component parts to assure proper workability at these or other flight control modes and utilizes a cooling management system to assure adequate cooling during all the flight regimes while efficiently utilizing the cooling air to minimize engine performance penalties. To conserve on air the flight management system feeds certain compartments defined within the centerbody and coordinates the source of cooling air between ram air and fan discharge air during given aircraft operating regimes.

SUMMARY OF THE INVENTION

An object of this invention is to provide a cool air management system for a movable centerbody operating in a two-dimensional exhaust nozzle of a gas turbine engine.

A still further object of this invention is to provide a cool air management system as described where fan discharge air from the engine and ram air are discretely controlled to supply cooling air in such a manner as to minimize engine performance losses. The air management system assures sufficient pressure so that cooling will be effectuated throughout the aircraft operating envelope.

Other features and advantages will be apparent from the specification and claims and from the accompanying drawings which illustrate an embodiment of the invention.

BRIEF DESCRIPTION OF THE DRAWING

FIG. 1 is a perspective view partially showing the aircraft and the engine exhaust employing this invention.

FIG. 1A is taken along line 1A—1A of FIG. 1 and is shown in perspective and enlarged to illustrate the cooling flow pattern in the adjacent compartments.

FIG. 6 is a schematic representation of the cool air distribution through the nozzle and centerbody.

FIG. 7 is taken along line 7—7 of FIG. 6 and is a partial section schematically illustrating the cooling air distribution through the nozzle and centerbody.

DESCRIPTION OF THE PREFERRED EMBODIMENT

Figure 4:
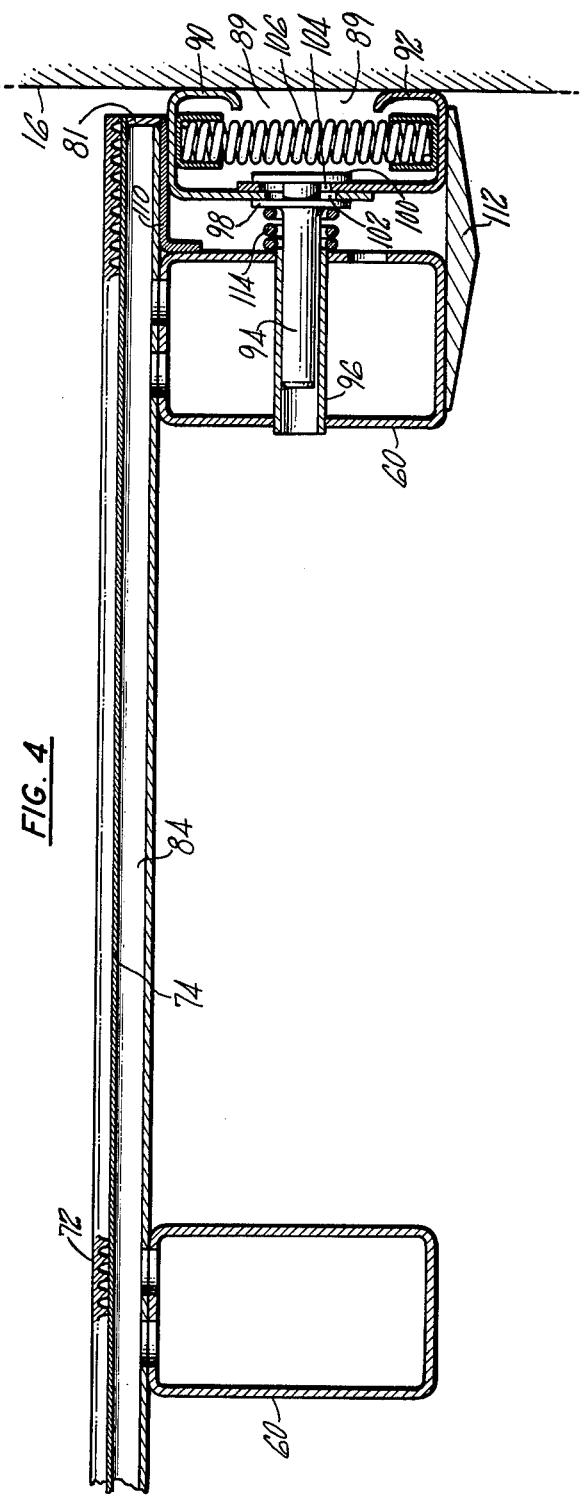
FIG. 4 is a detailed view in section and elevation showing the seal construction.

As can be seen from FIG. 1 showing the tail pipe portion 10 a gas turbine engine afterburner discharging into the two-dimensional nozzle generally illustrated by reference numeral 12 which may be fabricated integral with the engine nacelle. Centerbody wedge 14 extending between parallel side walls 16 and 18 and define with the two-dimensional nozzle an upper and lower channel for directing the exhaust gases overboard of the aircraft in order to effectuate thrust vectoring, nozzle area control and internal nozzle expansion. Two-dimensional nozzles and the obtaining of these enumerated features are known in the art and this invention is particularly concerned with the cooling of the nozzle and centerbody and controlling the cooling air to optimize cooling while minimizing engine performance penalties. U.S. Pat. No. 3,774,868 supra exemplifies an integrated nozzle with a centerbody and should be referred to for a more detailed description and is incorporated herein by reference.

As can be seen the centerbody comprises a leading edge 20, which may be fixed, trailing edge 22 and intermediate panels 24, 26 and 28 which may be articulated in any well known manner. Each section is compartmentized except for the trailing edge 22, into chambers A, B, C and D. A suitable pressure and cooling management control serves to distribute and regulate flow from a source of cooler air (as from the fan discharge in a turbofan installation) to cool and pressure balance the movable and collapsible wall centerbody wedge 14.

To this end, cooler air flows in the annular passage 30 formed between nacelle inner wall 32a of nacelle 32 and the cooling liner 34. The nacelle inner wall 32a and cooling liner 34 fairs from a circular cross section to a rectangular cross section for efficiently conducting flow from the engine tail pipe to the two-dimensional nozzle. Cooler air is admitted into compartment A of panel 20 as well as through the hollow beam support 38, into compartment B through pipe 36 and pressure reducer or modulating valve 120 and then through pipe 40 via diverter valve 124 pressure reducer or modulating valve 128 into compartment C and compartment D.

It is apparent from FIG. 1 that compartments A, B, C and D are divided into three separate compartments by bulkhead wall 42 and folding hinge 42a, hinge link 42b between compartments A and B (See FIG. 1A) and folding wall 44 between compartments B and C and folding wall 46 between compartments C and D and each compartment is pressurized to achieve both pressure balancing and adequate seal pressure as will be described hereinbelow.

Figure 5:
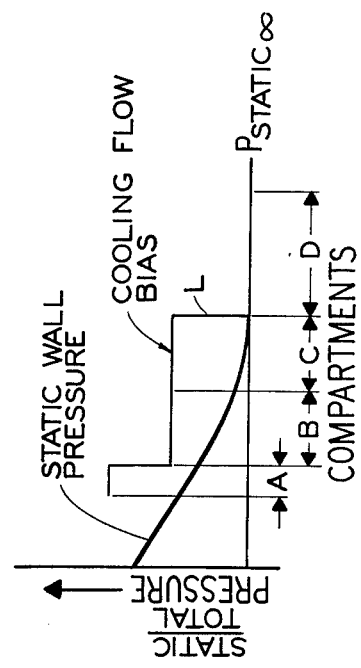
FIG. 5 is a graph illustrating the controlled pressure level in the centerbody at another flight condition.
Figure 2:
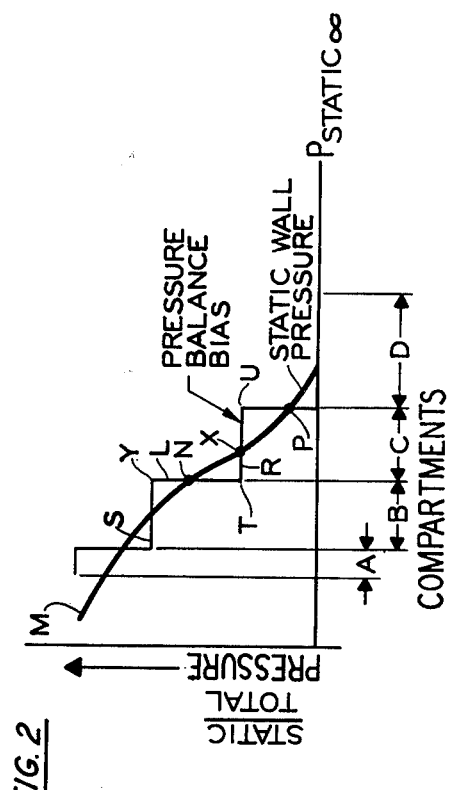
FIG. 2 is a graph illustrating the controlled pressure level in the centerbody at one flight condition.

The pressure distribution is best seen in the graph illustrated in FIGS. 2 and 5 for two different flight regimes. The pipe sizes and pressure reducers are selected to achieve a pressure drop described by stepped curve L from compartment A through D where the pressure admitted into compartment A is at its highest value and pressure discharge from D is at its lowest which is approximately equal to ambient. This pressure serves to pressure balance that is create a force equal and opposite to counteract the static wall pressure created by the exhaust engine gases flowing through the two-dimensional nozzle acting on the centerbody.

Thus, the overall force created by the outside and inside pressures acting on each of the panels of the centerbody tends to cancel each other.

The pressure management system and the seal arrangement also assures that the pressure on the seal as will be explained hereinbelow is so controlled from one panel to the other as to accommodate the situation where there is a pressure gradient reversal between the hot side (exposed to exhaust gases), and the cold air (exposed to cooling air) occurring along the axial length of the panel. That is to say, at some indeterminant point along the axial length of each centerbody compartment, the pressure acting internally creates a larger force on the panel than the pressure acting externally on the panel and the seal is designed to accommodate this occurrence. Thus, preventing (A) unwanted ingesting of hot gases into the centerbody and (B) the escape of cooling air from within the centerbody.

Figure 3:
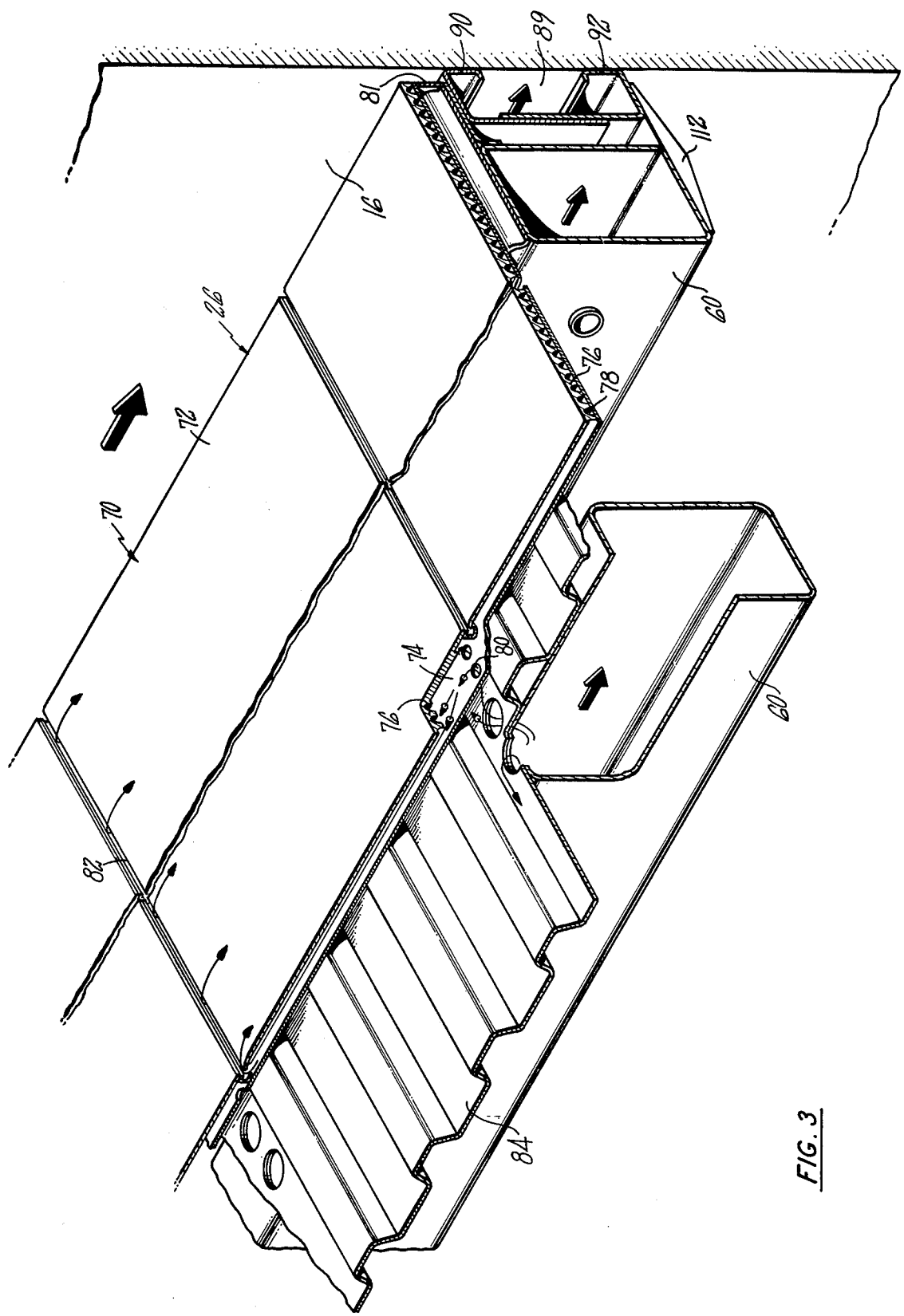
FIG. 3 is a partial view in perspective illustrating the panel and seal configuration of the centerbody wedge.

A typical panel construction is illustrated in FIG. 3 which shows laterally spaced hollow support beam 60 (only two of several being shown) that serves to support corrugated plate 84 and cooling panel 70 of Finwall ® construction. (The registered tradename of United Technology Corporation). The Finwall panels may comprise a corrugated sheet of metal sandwiched between upper and lower plates defining open ended channels or the channels may be formed integral with one of the space plates. As can be seen in FIG. 3 panel 70 as being representative has upper plates 72 and lower plates 74 and the laterally spaced webs 76 depending from plate 72 define open-ended channels 78.

Cooling air migrating through the centerbody structure finds its way through holes 80 formed in the lower plate 74 and flows through channels 78 counter to the flow of the engine exhaust passing over panel 72. The cooled air is discharged into the engine exhaust at the slot 82 located on the upstream end of panel 70. A plurality of panels make up each of the sections of the centerbody.

The Finwall panels are supported to a corrugated support plate 84 which, in turn, is supported to hollow support beams 60. It will be noted that openings communicating with the cool air passage in support beams 60 interconnect with the opening 80 feeding cool air to the Finwall panels. End plate 81 (one being shown) extend along the side edges of the corrugated support plate 84 to prevent cool air escapement.

As shown in FIG. 4 the hollow support beam 60 is spaced from the side edge of the centerbody adjacent the side wall which space 89 extends the side of each panel to the centerbody. Elongated substantially U-shaped seal elements 90 and 92 are supported in space 89. Spring loaded push rod 94 is supported for rectilinear movement in the bushing insert 96 secured to beam 60. Each of the seal elements 90 and 92 are retained between the flange elements 98 and 100 and are permitted to move vertically through the enlarged slots 102 and 104 formed respectively therein.

Spring 106 extending between seal elements 90 and 92 urge the seal in contact against the face of lip 110 and shelf 112. Pressure in space 89 as will be explained hereinbelow is higher than pressure in the adjacent compartment along the edge of the seal and the static wall pressure created by the engine exhaust gases.

The pressure pattern can best be understood by referring again to FIG. 2. Looking at compartment C, for instance the static pressure on the panel 26 is represented along curve M from points N to P. The cooling air pressure in compartment C as controlled by the pressure management system is an integrated pressure or pressure balance bias designed to substantially balance the forces acting externally on panel 26 and represented by line R. This equivalent pressure balance bias in the next preceding compartment B is represented by line S which is at some value higher than R (the pressure in compartment C). As noted from FIG. 1 support beam 60 of panel 26 extends into compartment B such that it leads cooling air from compartment B into channel 60 of panel 26, and the pressure between these points is substantially constant. This pressure, therefore, is higher than the pressure in compartment C and higher than the static wall pressure between points N and P. The fluid pressure in 60 is fed to space 89 so that the pressure in space 89 is substantially the same as in 60 along its axial length.

As noted from FIG. 2, the pressure balance bias pressure from points T and U from point X changes from being lower than the static wall pressure above point X to higher than the static wall pressure below point X. This reversal is accommodated by the seal pressure by maintaining the pressure in chamber 89 equal to the next preceding chamber pressure represented by point Y in this example. The pressure in all the other panels are similarly controlled.

As is apparent from the foregoing the higher pressure in space 89 acting on the underneath side of sealing elements 90 and 92 causes it to bear against the side wall of the two-dimensional nozzle and the elongated lip 110 and shelf 112 which is secured in any suitable manner to the underside of beam 60. The action of compression coil springs 106 and 114 work in the same direction as the force created by the pressure in space 89 and keep the seal elements 90 and 92 in sealing engagement under low pressure circumstances. In this manner, the hot gases exhausting from the engine and passing over the centerbody are kept from entering the centerbody and the cooling air is directed through the centerbody to effectively perform its cooling and pressure balancing functions.

In accordance with this invention the cool air management system serves to minimize the off design cooling air flow thrust losses throughout the flight envelope by providing a variable pressure level capability in the centerbody cavity. This is demonstrated by referring to the graphs shown in FIGS. 2 and 5, where FIG. 2 and 5 represents the typical static pressure distribution of and internal cavity balancing pressures for supersonic and sea level static flight conditions, respectively. Owing to a different static pressure distribution between both flight conditions the flow bias pressure in the compartments A, B, C and D likewise require a different pressure value. This is effectuated by proper control of the cooling air by the cool air management control system which is best seen by referring to FIGS. 1, 6 and 7.

As noted fan discharge air in the annular passage 30 is continuously admitted into chamber A and cools the fixed leading edge 20 by impingement cooling and is metered through modulating valve 120 into compartment B. Air from compartment B is conducted to the side wall 16 via line 122 where it is utilized for cooling, it being appreciated that the side wall panels are preferably constructed similar to the construction of panel 70 described in FIG. 3.

In one position of shuttle or diverter valve 124 air in compartment B is fed to the downstream compartment C and D via conduit 40. Metering valve 128 serves to regulate the pressure to assure that the pressure in these downstream compartments conforms to the schedules for the various flight conditions.

In order to conserve on air supply from the fan and hence minimize engine thrust loss the invention contemplates utilizing ram air which may be supplied in any well known manner as by a ram air scoop. Ram air is introduced into the system in duct 130 where diverter valve 124 is positioned to block off compartment B air (and hence fan discharge air) and open ram air to the inlet of modulating valve 128. Obviously the use of ram air will depend on its pressure level and will only be used when that level is sufficiently high to effectuate cooling. To this end, valves 120, 124 and 128 will require control mechanism to coordinate the proper flow and pressure necessary to provide the optimum cooling at the minimum engine performance penalties. Such control mechanisms are well known and it is not deemed an important adjunct of this invention and is omitted herefrom for the sake of convenience. Suffice it to say that the control would serve to operate these valves to perform the following functions.

| Sea Level Flight Regime | Valve** Open 120 | Valve** Open 128 | Valve Engine Air 124 |
|---|---|---|---|
| Afterburner on Subsonic | Open | Open | Engine Air |
| Afterburner on Subsonic | Closed | Closed | Closed |
| Afterburner off *Subsonic Afterburner off Infrared suppresion | Closed | Open | Ram Air |
| *High Mach No. Afterburner on | Open | Open | Ram Air |

*Above critical Mach No. for Ram Air Supply
**Valves 120 and 128 are infinitely variable It should be understood that the invention is not limited to the particular embodiments shown and described herein, but that various changes and modifications may be made without departing from the spirit or scope of this novel concept as defined by the following claims.

We claim:

1. For aircraft powered by a gas turbine engine and having a two-dimensional exhaust nozzle, an articulating centerbody disposed in said two-dimensional nozzle for effectuating flight control of said aircraft, means to cool said centerbody including a source of cooling air, a series of axially aligned chambers formed in the cavity of said centerbody, panel members defining the outer wall of said centerbody and having cooling passages formed therein, manifold means supporting said panels and having openings in the preceding chamber to conduct cooling air to said passage for cooling said panels, an air cooling management system having conduit means having an inlet with one of said compartments and at least one outlet with another of said compartments disposed downstream thereof, modulating valve means in said conduit means for regulating the pressure of said cooling air in said downstream compartment, so that air from said source communicates with an upstream compartment and the downstream compartments communicate with the air in said upstream compartment whereby the pressure of the cooling air is at a level sufficiently high to conduct air internally of said centerbody to the gas exhaust stream in said nozzle.

2. A cooling air management system as in claim 1 wherein said gas turbine engine includes a fan and said source is fan discharge air.

3. A cooling air management system as in claim 2 including a source of ram air, a diverter valve disposed upstream of said modulating valve for interconnecting said ram air and said modulating valve or alternatively interconnecting said source with said modulating valve.

4. A cooling air management system as in claim 3 including another modulating valve disposed upstream in series flow relation to said modulating valve for independently controlling said pressure in the compartment immediately upstream of said modulating valve.

5. A cooling air management system as in claim 4 wherein said gas turbine engine includes an afterburner and said modulating valve, said other modulating valve and said diverting valve are positioned to schedule cooling flow in accordance with a predetermined flight envelope wherein both of said modulating valves are open and said diverter valve is opened to said source and closed to ram air during sea level and subsonic operation with the afterburner on and both of said modulating valves closed during subsonic flight conditions when said afterburner is off.

6. A cooling air management system as in claim 5 wherein said modulating valve, said other modulating valve and said diverting valve are positioned to schedule cooling flow such that said modulating valve is closed and said other modulating valve is opened and said diverter valve is open to ram air and closed to said source when said aircraft is flying subsonic and the afterburner is off so as to suppress infrared detection.

7. A cooling air management system as in claim 6 wherein said modulating valve is open and said other modulating valve is open and said diverter valve is open to ram air and closed to said source during high Mach No. flight when the afterburner is on.

* * * * *

UNITED STATES PATENT AND TRADEMARK OFFICE
CERTIFICATE OF CORRECTION

PATENT NO. : 4,098,076
DATED : July 4, 1978
INVENTOR(S) : John H. Young, Gerald F. Goetz It is certified that error appears in the above-identified patent and that said Letters Patent are hereby corrected as shown below:

In the Table in Column 5, please make the following changes:

|  | Valve** | Valve** | Valve |
|---|---|---|---|
| Flight Regime | 120 | 128 | 124 |
| Sea Level Afterburner on | Open | Open | Engine Air |

Signed and Sealed this

Twenty-third Day of October 1979

[SEAL]

Attest:

RUTH C. MASON
Attesting Officer

LUTRELLE F. PARKER
Acting Commissioner of Patents and Trademarks